(12) United States Patent
Shen et al.

(10) Patent No.: US 8,316,378 B2
(45) Date of Patent: Nov. 20, 2012

(54) DATA FLOW CONTROL IN WIRELESS COMMUNICATION SYSTEMS

(75) Inventors: John Zijun Shen, Winchester, MA (US); Carsten Aagaard Pedersen, Belmont, MA (US); Deepak Mathew, Wilmington, MA (US); Paul Donald Krivacek, North Andover, MA (US); Aiguo Yan, Andover, MA (US); Timothy Perrin Fisher-Jeffes, Cambridge, MA (US)

(73) Assignee: MediaTek Inc., Hsin-Chu (TW)

( * ) Notice: Subject to any disclaimer, the term of this patent is extended or adjusted under 35 U.S.C. 154(b) by 1042 days.

(21) Appl. No.: 12/254,201

(22) Filed: Oct. 20, 2008

(65) Prior Publication Data

US 2009/0165019 A1 Jun. 25, 2009

Related U.S. Application Data (60) Provisional application No. 61/008,966, filed on Dec. 21, 2007, provisional application No. 61/093,269, filed on Aug. 29, 2008.

(51) Int. Cl.
 *G06F 9/44* (2006.01)
 *G06F 15/16* (2006.01)
 *H04M 1/64* (2006.01)
(52) U.S. Cl. ........ 719/313; 719/314; 712/35; 379/88.07
(58) Field of Classification Search .................. 719/310, 719/313, 314; 712/35; 379/88.07
 See application file for complete search history.

(56) References Cited

U.S. PATENT DOCUMENTS

| | | | |
|---|---|---|---|
| 4,893,234 A * | 1/1990 | Davidson et al. ............... | 712/27 |
| 5,235,594 A * | 8/1993 | Lee ................................ | 370/438 |
| 6,052,037 A | 4/2000 | Kaku et al. ..................... | 332/100 |
| 7,269,207 B2 * | 9/2007 | Lilleberg et al. ............... | 375/152 |
| 7,756,483 B2 * | 7/2010 | Chang et al. ................ | 455/67.13 |
| 7,945,258 B2 * | 5/2011 | Sollenberger et al. ........ | 455/423 |
| 8,102,956 B2 * | 1/2012 | Dai et al. ....................... | 375/347 |
| 2003/0191887 A1 | 10/2003 | Oates et al. | |
| 2009/0036117 A1 * | 2/2009 | Sollenberger et al. ........ | 455/424 |
| 2009/0161796 A1 | 6/2009 | Fisher-Jeffes ................. | 375/317 |

FOREIGN PATENT DOCUMENTS

| | | |
|---|---|---|
| EP | 1 855 393 | 11/2007 |
| WO | WO 2006/020283 | 2/2006 |
| WO | WO 2008/042210 | 4/2008 |

OTHER PUBLICATIONS

Parker, "Techniques for the Blind Estimation of Signal to Noise Ratio for Quadrature Modulated Signals," International Symposium on Signal Processing and its Applications, ISSPA, Gold Coast, Australia, Aug. 25-30, 1996, pp. 238-241.

* cited by examiner

*Primary Examiner* — Van Nguyen
(74) *Attorney, Agent, or Firm* — Fish & Richardson P.C.

(57) ABSTRACT

A method includes receiving data in a first data processing module, and enabling a second data processing module when at least one signal time slot of the received data comprises data that complies with a first data transmission standard. The method also includes exchanging signals between the first data processing module and software executing in a processor, and determining that a software configuration of the second data processing module has been completed. The method also includes processing the data in the second data processing module for the at least one signal time slot, and enabling a third data processing module upon a completion of processing at least one data block in the second data processing module, and determining that a software configuration of the third data processing module has been completed, the at least one data block comprising multiple signal time slots.

22 Claims, 9 Drawing Sheets

| | Description | Data Transfer Direction | Frequency of Transfer |
|---|---|---|---|
| 1 | JDA Input data | (SOFTWARE → JDA) | Once per slot |
| 2 | ACD power values | (JDA → SOFTWARE) | Once per slot |
| 3 | ACD active channel and scaling parameters | (SOFTWARE → JDA) | Once per slot |
| 4 | JDA output | (JDA → Post JD) | Once per slot |
| 5 | Post JDA output for CQI | (Post JD → SOFTWARE) | Once per slot |
| 6 | Post JDA output to High Speed (HS) BRP | (Post JD → BRP) | Once per slot |
| 7 | BRP Output | (BRP → SOFTWARE) | Once per TTI |
| 8 | HS Post JD control parameters | (SOFTWARE → Post JD) | Once per TTI |
| 9 | HS BRP control parameters | (SOFTWARE → BRP) | Once per TTI |

FIG. 5

| | Interrupt | Description | Software Action | Reset value |
|---|---|---|---|---|
| 1 | PostJD EOF (End of Frame) | Post JD processing of current TTI is complete | Only used for BRP flow control. | 0 |
| 2 | HS_BRP_IP_READY | BRP front end processing of current frame is complete. Frame memory is emptied into HARQ memory (BRP hardware can accept next frame of input data) | Program Post JD parameters for next TTI. Program BRP register HS_SLOT_SIZE along with PostJD parameters (Post JD parameters are send to hardware immediately after sending JDA input data of that slot or earlier to avoid stalls) | 1 (Interrupt will be asserted after reset) |
| 3 | HS_BRP_DONE | BRP processing of current TTI is complete | Program HSDPA BRP parameters for next TTI | 0 |

FIG. 6

| PostJD: HS_RX_EN=0 | PostJD: HS_RX_EN=1 (HSDPA TTI) |||||
|---|---|---|---|---|---|
| TTI not used for HSDPA.  Ignore all HSDPA registers.  JDA works in Rel4 mode. | JDA: HSDPAEn= 0  Timeslot not used for HSDPA.  Ignore all HSDPA registers.  JDA works in Rel4 mode. | JDA: HSDPAEn=1 (HSDPA Timeslot) |||| 
| | | PostJD: CONFIG_READY=0 | PostJD: CONFIG_READY=1 |||
| | | Exception case: PostJD configuration not ready.  PostJD generates ConfigNotReady interrupt.  PostJD stalls processing chain until PostJD parameters are sent and CONFIG_READY is set to 1. | PostJD copies all HSDPA data in JDA output buffer to PostJD internal memory.  PostJD processes timeslot based on configuration.  PostJD signals to JDA when done reading JDA output. |||
| | | | PostJD: JD_OUTPUT_MODE=0 | PostJD: JD_OUTPUT_MODE=1 ||
| | | | JDA transfers all JDA Output (HSDPA + non-HSDPA) via DMA.  PostJD triggers BRP if TTI is done. | JDA removes HSDPA codes from JDA output buffer.  JDA transfers remaining JDA output via DMA.  PostJD triggers BRP if TTI is done. ||

DATA FLOW CONTROL IN WIRELESS COMMUNICATION SYSTEMS

CROSS-REFERENCE TO RELATED APPLICATION

This application claims priority to U.S. Provisional Application Ser. No. 61/008,966, filed Dec. 21, 2007, and U.S. Provisional Application Ser. No. 61/093,269, filed Aug. 29, 2008, both of which are hereby incorporated by reference in their entirety.

BACKGROUND

This document generally relates to wireless communication systems. Early mobile or wireless communication systems, now referred to as first generation (1G), used analog technology called frequency division multiple access (FDMA) to deliver a radio-based voice channel to a mobile telephone user. In the late 1980s, second generation (2G) systems were deployed using digital technologies. The first U.S. system used time division multiple access (TDMA). In the early 1990s, TDMA technology was used to introduce the Global System for Mobile Communication (GSM) to Europe. In the mid 1990s, code division multiple access (CDMA) became the second type of digital 2G system, with the U.S. introduction of Interim Standard-95 (IS-95).

Wideband CDMA (WCDMA) is a transmission technology for 3G (third generation) Universal Mobile Telecommunications System (UMTS) mobile or wireless communication. WCDMA systems support voice and data transmission with variable data rates in wireless communication channels such as random access channels, paging channels, broadcast channels, etc. WCDMA systems contain one or several radio frequency carriers. Each radio frequency carrier contains a number of spreading codes which may be allocated to provide different data rates to satisfy different mobile user requirements.

WCDMA systems often utilize transport channels which may be mapped to physical channels. The physical layer/channel (layer 1) is the lowest layer in the OSI Reference Model and it supports functions used for the transmission of bit streams on the physical medium. The physical layer subsequently provides data transport services to higher layers of the wireless communication system. Characteristics of a transport channel are defined by its transport format (or format set), specifying the physical layer processing to be applied to the transport channel in question, such as convolutional channel coding and interleaving, and any service-specific rate matching as may be needed. Transport channels may represent services offered by Layer 1 to the higher layers.

Exemplary transport channels include: a) common transport channels such as BCH (broadcast channel, often used as a downlink (DL) transport channel to broadcast system and/or cell specific information), FACH (forward access channel), PCH (paging channel), RACH (random access channel), CPCH (common packet channel), and DSCH (downlink shared channel), and b) dedicated channels (DCH) which may be used on the uplink or downlink.

TD-SCDMA (Time Division Synchronous Code Division Multiple Access) is also a transmission technology for 3G (third generation) Universal Mobile Telecommunications System (UMTS) mobile or wireless communication. TD-SCDMA uses time domain duplexing in combination with code domain multiple access techniques to support both symmetrical and asymmetrical traffic.

High speed downlink packet access (HSDPA) is an important feature of Release 5 of the third Generation Partnership Project (3GPP) specification and represents the first step in the evolution of TD-SCDMA toward high data rates. More specifically, HSDPA is a UMTS enhancement to provide increased downlink data rates that is defined in Release 5 of the UMTS specifications. The HSDPA is expected to increase system capacity, reduce roundtrip delay and increase peak data rates to more than 2.0 megabits per second. A new shared channel called high speed downlink shared channel (HS-DSCH) has been introduced to support the above goals.

In traditional communication systems, the baseband receiver includes two main components: an inner receiver, also known as an equalizer or a chip rate processor, which mitigates the effects of multi-path and interference, and an outer receiver which performs channel decoding and other symbol rate processing.

SUMMARY

In general, in one aspect, a method for controlling data flow in a wireless communication system is presented. The method includes receiving data in a first data processing module; enabling a second data processing module when at least one signal time slot of the received data comprises data that complies with a first data transmission standard; exchanging signals between the first data processing module and software executing in a processor to indicate that the first data processing module is ready to transmit data to the second data processing module, and determining that a software configuration of the second data processing module has been completed; processing the data in the second data processing module for the at least one signal time slot; and enabling a third data processing module upon a completion of processing at least one data block in the second data processing module, and determining that a software configuration of the third data processing module has been completed, the at least one data block comprising multiple signal time slots.

Implementations may include one or more of the following features. The first data transmission standard may comprise high speed downlink packet access (HSDPA). The first data processing module may include a joint detection accelerator comprising a first-in, first-out (FIFO) module. The second data processing module may process and convert output data from the first data processing module into a format suitable for the third data processing module. The first data processing module may be configured to: extract data that complies with a second data transmission standard, and process the data in the second data transmission standard by software executing in a processor. The third data processing module may include a bit rate processor. The software executing on a processor may provide a constellation gain value to the second data processing module. The second data processing module is configured to provide a signal-to-interference-and-noise-ratio (SINR) value. The SINR value may be computed on a time slot basis. The third data processing module may include a bit rate processor.

In general, in some aspects, an apparatus for controlling data flow in a wireless communication system is presented. The apparatus includes a first data processing module that receives data; circuitry to indicate that the first data processing module is ready to transmit the data to a second data processing module, and determines that a software configuration of the second data processing module has been completed, the second data processing module extracting and processing at least one signal time slot comprising data that complies with a first data transmission standard; and a third data processing module enabled upon a completion of processing at least one data block in the second data processing module, the at least one data block comprising multiple signal time slots.

Implementations may include one or more of the following features. The first data transmission standard may be high speed downlink packet access (HSDPA). The first data processing module may include a joint detection accelerator comprising a first-in, first-out (FIFO) module. The second data processing module may process and convert output data from the first data processing module into a format suitable for the third data processing module. The first data processing module may be configured to: extract data that complies with a second data transmission standard, and process the data in the second data transmission standard by software executing in a processor. The third data processing module may include a bit rate processor. The software executing on a processor may provide a constellation gain value to the second data processing module. The second data processing module may be configured to provide a signal-to-interference-and-noise-ratio (SINR) value. The SINR value may be computed on a time slot basis. The third data processing module may include a bit rate processor.

In general, in some aspect, a method for controlling data flow in a wireless communication system is presented. The method includes receiving data in a first data processing module, comprising outputting data that complies with a first data transmission standard to a digital signal processor (DSP) in the wireless communication system, and enabling a second data processing module upon detecting at least one time slot comprising data that complies with a second data transmission standard; configuring the second data processing module by the DSP for each transmission time interval (TTI) including multiple time slots, comprising: setting corresponding control bits in a plurality of configuration registers, and issuing interrupts to the DSP to request a configuration upon a completion of the configuration, processing data in the second data processing module for each time slot; and enabling a third data processing module upon completing at least one TTI in the second data processing module.

Implementations may include one or more of the following features. The interrupts may be maskable. Receiving data in the first data processing module may operate on data on a time slot basis. Processing data that complies with a second data transmission standard in the second data processing module may include processing the data on a transmission time interval basis. The first data transmission standard may be non-high speed downlink packet access (HSDPA). The corresponding software in the wireless communication system may include a digital signal processor.

In general, in some aspects, an apparatus for controlling data flow in a wireless communication system is presented. The apparatus includes means for separating data that complies with different data transmission standards; a first plurality of hardware signal processing modules configured to process data that complies with a first data transmission standard on a time slot basis; a second plurality of hardware signal processing modules configured to process data that complies with the first data transmission standard on a transmission time interval (TTI) basis including one or more time slots; and software executing on a data processor for processing data that complies with a second data transmission standard and configuring the first and the second plurality of hardware signal processing modules; wherein the first and the second plurality of hardware signal processing modules and the software exchange signals according to a handshake protocol before processing each of the time slots and TTIs.

Implementations may include one or more of the following features. The first data transmission standard may be high speed downlink packet access (HSDPA). The first plurality of hardware signal processing modules may comprise a joint detection accelerator. The second plurality of hardware signal processing modules may process and convert output data from the first plurality of hardware signal processing modules into a format suitable for downstream data processing modules in the wireless communication system.

The details of one or more implementations of the disclosure are set forth in the accompanying drawings and the description below. Other features, objects, and advantages of the disclosure will be apparent from the description and drawings, and from the claims.

DETAILED DESCRIPTION

Figure 1A:
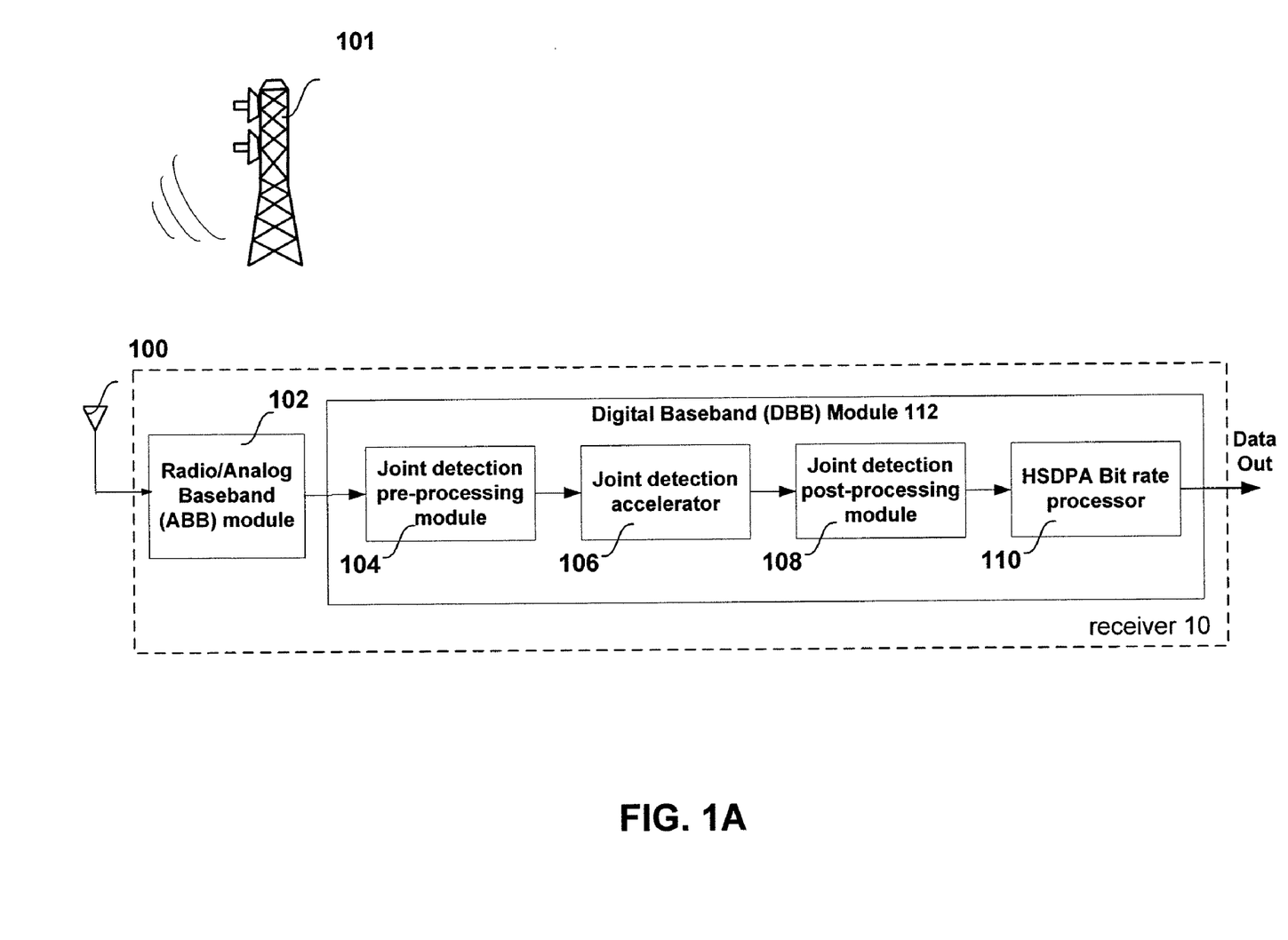
FIG. 1A shows a block diagram of a simplified downlink signal processing chain in a high speed downlink packet access (HSDPA) receiver.

FIG. 1A illustrates an example wireless communication system downlink signal processing chain in a HSDPA receiver 10. A radio/analog baseband (ABB) module 102 receives wireless signals from a base station 101 via an antenna 100 and transmits the signal to other signal processing modules in the downstream signal chain. Receiver 10 may support one or more of the wireless standards or protocols, for example, non-HSDPA. The ABB module 102 may perform amplification and filtering of received signals in the analog domain and supply a digital signal at its output. Subsequently, a digital baseband (DBB) module 112 performs signal processing on the signal mostly in the digital domain. In order to permit the ABB module 102 and DBB module 112 to interact, the receiver 10 may include an analog to digital (A/D) converter and a digital to analog (D/A) converter (not shown in FIG. 1) to convert signals between analog and digital domains.

As shown in FIG. 1A, circuitry for implementing a TD-SCDMA digital baseband module 112 can include a joint detection pre-processing module 104, a joint detection accelerator (JDA) 106, a joint detection post-processing module 108 (i.e., a PostJD module 108) followed by a HSDPA bit rate processor (BRP) 110. Unlike a matched filter-based receiver that regards the interferences as noises, a joint detector (JD), or a "multi-user detector", is a device designed to remove an influence of the interferences between the users by processing user interference signals as separate signals. As such, joint detection algorithms performed by the joint detector can simultaneously detect data transmitted in all codes, thereby reducing (e.g., minimizing) inter-symbol interference (ISI) and multi-access interference (MAI). In some examples, joint detection algorithms may use zero forcing (ZF) (see Equ. (1) below) and linear minimum mean square error (LMMSE) (see Equ. (2)).

$$\operatorname*{argmin}_{\hat{d}} |T\hat{d} - r|^2 \Rightarrow \hat{d} = (T^H T)^{-1} T^H r \qquad \text{Equ. (1)}$$

$$\operatorname*{argmin}_{\hat{d}=Sr} E[|\hat{d} - d|^2] \Rightarrow \hat{d} = Sr = (T^H T + \sigma_n^2 I)^{-1} T^H r \qquad \text{Equ. (2)}$$

where $\sigma^2$ is the noise power and received data r can be expressed in terms of the transmitted data d and the cumulative effect of the channelization/scrambling codes and the channel impulse response, via a matrix T, plus the noise z:

$$r = Td + z.$$

In some examples, joint detection in a wireless communication system may be implemented as a software solution (e.g., a programmable digital signal processor (DSP)), or via a hardware solution, in the form of an electrical circuit such as the joint detection accelerator (JDA) 106 in FIG. 1. In contrast to joint detection implemented in software, using the JDA may reduce power consumption and chip area, and improve overall receiver performance. JDA may provide solution for the linear equations (1) and (2) listed above with r and $\sigma^2$ being provided by the software and T being calculated using the information provided by the software. The receiver 10 supports both ZF and LMMSE algorithms, and ZF can be viewed as a special case of LMMSE with $\sigma_n^2$ equal to zero.

The joint detection pre-processing module 104 is responsible for producing input data for the JDA 106. The PostJD module 108 interfaces between the JDA 106 and the BRP 110. More specifically, the PostJD module 108 processes and converts output from the JDA 106 into a format suitable for the BRP 110.

In a wireless communication system, data is usually downloaded in increments of one time slot or subframe, but internally processed by the BRP 110 at a frame rate and/or a transmission time interval (TTI) rate. TTI is a parameter in UMTS (and other digital telecommunication networks) related to encapsulation of data from higher layers into frames for transmission on the radio link layer. TTI refers to the length of an independently decodable transmission on the radio link. More specifically, TTI is related to the size of the data blocks passed from the higher network layers to the radio link layer.

Figure 1B:
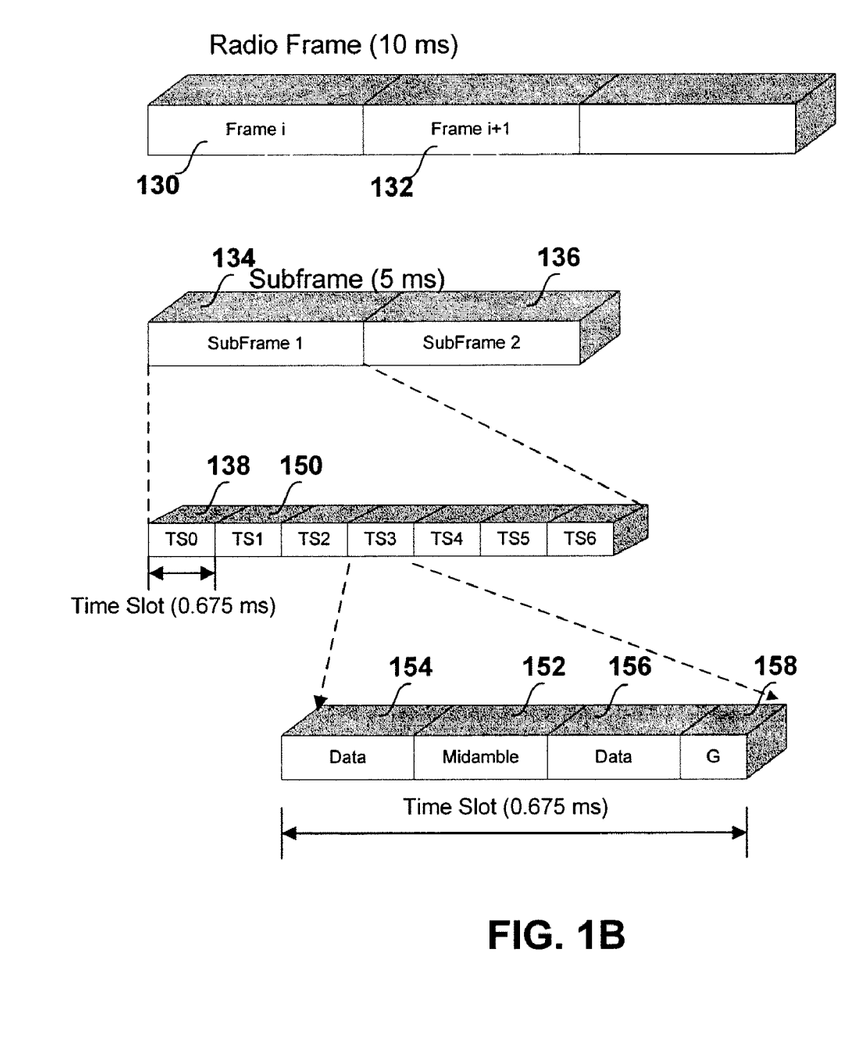
FIG. 1B is a diagram of an example TD-SCDMA data structure.

FIG. 1B shows a schematic representation of an example TD-SCDMA data structure. Data is transmitted as a series of radio frames 130, 132, etc., each having a duration of 10 ms (milliseconds). Each radio frame is divided into two subframes 134 and 136, each having duration of 5 ms. Each subframe is made up of seven time slots TS0 138, TS1 150, etc., each having a duration of 0.675 ms. Each time slot includes four parts, a midamble 152 with one hundred and forty-four (144) chips duration, two data fields 154, 156 with three hundred and fifty-two (352) chips duration before and after the midamble 152, followed by a guard period 158 of sixteen (16) chips. The midamble 152 carries known data and is used by the receiver to perform channel estimation. The seven time slots (e.g., TS0, TS1, etc.) in each subframe (e.g., 134 or 136) may be divided between uplink and downlink traffic, according to the traffic in each direction.

The BRP 110, in one implementation, may process data on a TTI basis. In some examples, the BRP 110 may be partitioned into two main computational elements 1) BRP front end processing and 2) BRP back end processing. BRP front end processing consists of all processing blocks before the Hybrid Automatic Repeat ReQuest (HARQ) memory, including de-modulation, de-interleaver and de-rate matching. The processing of BRP front end is triggered by the hardware upon a completion of the following two events.

Software ready (or software trigger): Software can write the trigger register after transferring all control parameters to the hardware.

Hardware ready (or end of TTI signal): Hardware ready indicates that all soft decisions for the current TTI has reached the frame memory. PostJD module 108 transfers the soft decisions to the frame memory on a slot-by-slot fashion. BRP front-end processing is scheduled immediately after receiving the software ready and hardware ready signal.

BRP 110 backend processing includes all processing blocks after the HARQ memory followed by the front end processing.

Figure 2:
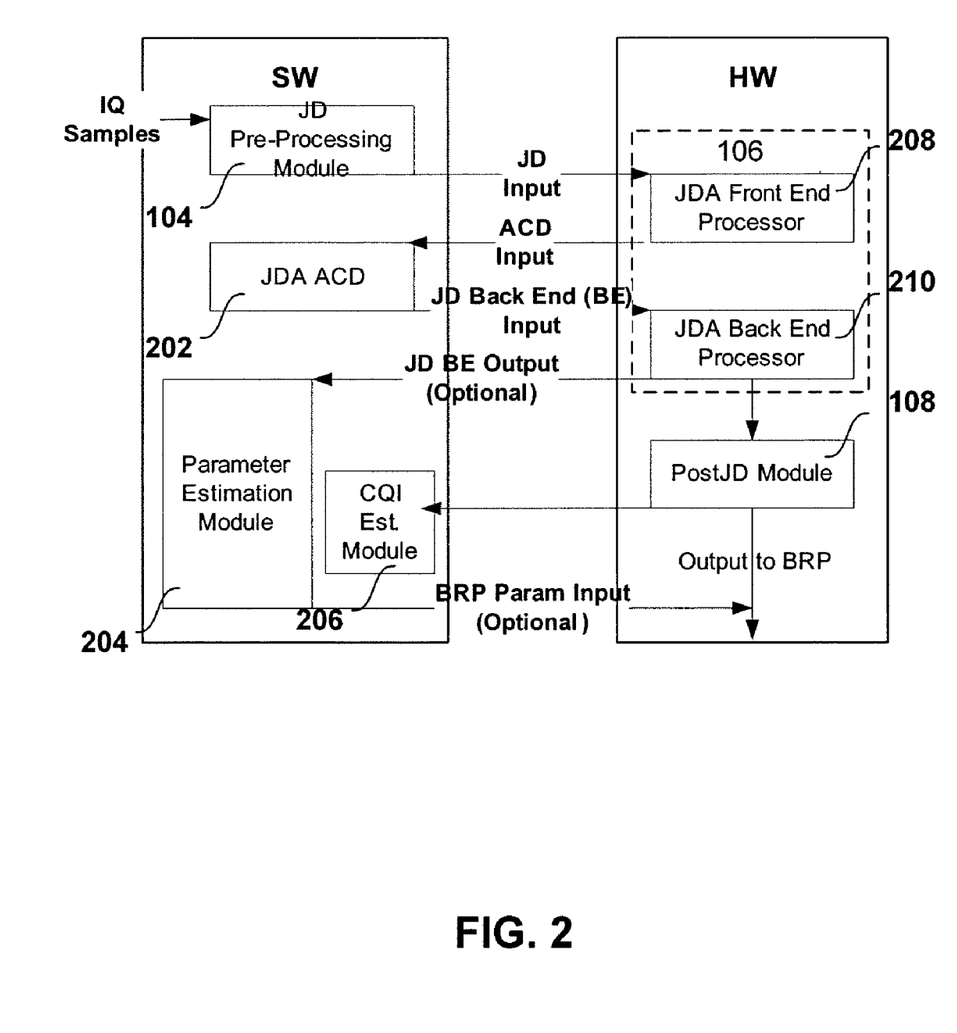
FIG. 2 shows high level hardware and software partitioning and hardware data flow of joint detection functionality in HSDPA channels.

FIG. 2 shows an example of the joint detection pre-processing module 104, the JDA 106 and the PostJD module 108 implemented in both software and hardware, and the data flow control among the software and hardware. Here, the term "software" broadly refers to a collection of computer programs and procedures that perform some tasks on a computer system or a distributed computing system. Software can offer a wide variety of features with great flexibility because programming codes can be easily updated. Here, "hardware" may refer to physical apparatus and devices, such as circuitry, microchips, digital processor, and micro-controller, etc. Digital signal processing hardware may offer robust and fast signal processing, but it may be more difficult to upgrade hardware to offer new functionality. By carefully partitioning an application so that some portions of the application are implemented in software and some portions of the application are implemented in hardware, a signal processing system can achieve better results than if only either software or hardware is used.

As shown in FIG. 2, both the JDA 106 and PostJD module 108 are implemented in hardware. The JDA 106 can be further partitioned into a JDA front end processor 208 and a JDA back end processor 210. The PostJD module 108 obtains data from the JD Back End processing module 210 and delivers physical channel de-mapped symbols to the BRP 110. The PostJD module 108 also provides a Signal-to-Interference-and-Noise-Ratio (SINR) estimation to a parameter estimation module 204 on the software side. A channel quality indicator (CQI) estimation module 206 may also receive data from the PostJD module 108.

In some implementations, the PostJD module 108 can be further partitioned between hardware for HSDPA data channels (HS-DSCH) (e.g., extracting HSDPA physical channel data) and software for all other channels. By invoking appropriate hardware and software to control the data flow, the PostJD module 108 enables an added layer of flexibility on top of the existing hardware. This feature provides flexibility to support future evolution of the TD-SCDMA standard, which may require additional processing or stricter requirements for SINR and constellation gain estimation than what the current PostJD hardware is designed for.

Radio frequency (RF) receivers (e.g., the receiver 10 in FIG. 1A) or transmitters employing direct conversion architectures generate in-phase and quadrature (IQ) signals. These signals may have distortions that limit subsequent demodulator or modulator performance. The distortions, called quadrature errors, are caused by the gain and phase imbalances between the IQ signal components. Imbalance in IQ signals may induce an image frequency and direct current offset which interfere with the demodulation or modulation process. To correct the IQ imbalance, in some implementations, a joint detection pre-processing module 104 may be used, as shown in FIG. 2.

The JDA front-end processor 208 receives pre-processed IQ samples, channel information and control information such as channelization codes, and produces intermediate results that are used by a JD active code detection (ACD) module 202. This module 202 estimates the active codes for each of the time slots after receiving output data from the JD front end processing module 208. The active code detection algorithm may be implemented in software.

A JDA back-end processing module 210 is enabled after receiving the list of active codes from the software. In addition, an operation mode called ACD-skip may be support by the hardware-software partitioning architecture shown in FIG. 2. That is, if a set of active codes is known in advance, the JD ACD module 202 becomes transparent. The design target of the receiver 10 described in this documents is to support both 384 Kbps and 2.8 Mbps channels. HSDPA channels at up to 2.8 Mbps and the 384 Kbps channels contain different sets of data. The data flow control for different data channels in a single hardware processor is a challenge to ensure a high performance TD-SCDMA system. The switching between the 384 Kbps and the 2.8 Mbps applications is implemented on the fly in the hardware processor without stalling the overall receiver system 10. A software programming model is used to enable handshaking between software and hardware modules at different hardware processing stages.

Employing efficient hardware-software partitioning and data flow control, the receiver 10 is capable of supporting both TD-SCDMA Release 4 and Release 5 of the 3GPP standard without hardware stalling. This is accomplished by carefully designing hardware interfaces together with a set of software programming models to implement handshake protocols between the hardware and software.

Figure 3:
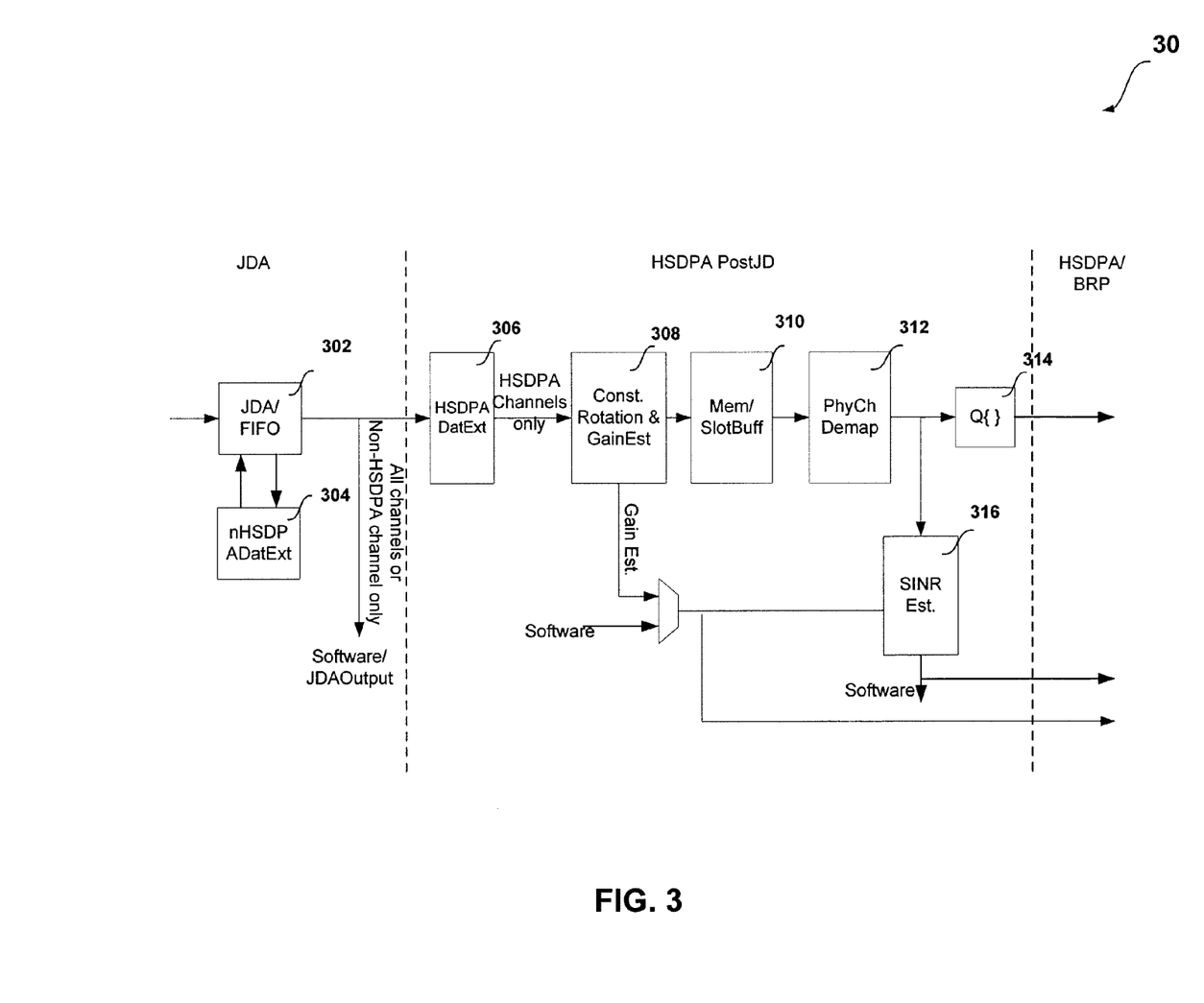
FIG. 3 shows an example implementation of HSDPA PostJD data flow.

FIG. 3 shows an implementation of HSDPA PostJD data flow control. An output first-in, first-out (FIFO) 302 of the JDA 106 buffers different data sets at the different processing stages. A top level state machine (not shown in FIG. 3), which can be implemented in hardware, controls the data sets that are stored in the output FIFO 302. This mechanism makes the downstream hardware processing for a HSDPA application (i.e., a cell phone, a data card) available, yet it can still support 384 Kbps channels in one TTI.

In some examples, a HSDPA application may process data on a TTI basis, while the PostJD module 108 operates on a timeslot basis. This distinction may result in hardware stalling when HSDPA data is delivered from the FIFO 302 to the PostJD module 108, or when data is sent to the BRP 110 from the PostJD module 108. To reduce hardware stalling, software control or a HSDPA programming model can be implemented to temporarily hold data processing at the beginning of the post JD processing (i.e., the PostJD module 108 operations) and the beginning of the bit rate processing (i.e., the BRP 110 operations). Furthermore, maskable interrupt requests (IRQs) can be provided to allow hardware processing status information be used to signal the software when to start certain operations, and to enable the next TTI input data to be transferred to the JDA/FIFO 302. In one implementation, a general interrupt mask register (not shown) may determine which interrupts can be generated. In some examples, when an interrupt mask bit is set, it can prevent the associated interrupt from propagating out to the interrupt output of the BRP 110, but the associated interrupt status bit will still be set in the global interrupt status register. When an interrupt is active while its interrupt mask bit is cleared, the interrupt will propagate to the BRP 110 output. By default, all mask bits are set to 1, so in order to generate the required interrupts, their associated mask bits may be cleared first.

The HSDPA programming model can define a flag that notifies the hardware which time slot contains HSDPA channel codes, thereby switching data processing from 384 Kbps channels to the HSDPA applications, or vise versa, seamlessly. The HSDPA programming model may define the data flow such that the top level hardware state machine monitors the hardware processing stages to enable or disable data transfers from the JDA 106 to the PostJD module 108 and further to the software and the BRP 110 at the appropriate time. The HSDPA programming model can define the operations performed by the PostJD module 108 and the BRP 110.

The JD post processing for combined dedicated channels and the HSDPA control channels may be implemented in software. The output of PostJD processing for HSDPA data channels may be directly sent to the BRP module 110. In other words, the JD post processing may be performed in two independent ways: a software solution for non-HSDPA channels, and a PostJD hardware solution for processing of HSDPA channel codes. In one implementation, JDA input data includes input data may in a pre-defined format (e.g., a 16-bit sequence with a specific allocation for each bit). A PostJD hardware processor may be controlled or enabled by a particular bit in the JDA 106 input data sequence (e.g., a HSDPAenable bit in the 16-bit sequence).

In operation, channel codes of multiple transmission rates and standards are delivered through JDA 106 output. A multiplexer may select and direct non-HSDPA channel codes to software for further signal processing. The selection can be done by setting a JDA_OUT_MODE bit in a PostJD Configuration Register. Non-HSDPA codes are extracted by performing a non-HSDPA Data Extraction algorithm (e.g., using nHSDPADatExt module 304).

In some examples, the HSDPAenable bit embedded in the JDA input may enable PostJD hardware 108 and cause HSDPA channel code to be routed to the hardware Post JD 108 after performing HSDPA data extraction calculations (i.e., after the HSDPADatExt module 306). Input data from the JDA output FIFO 302 contains various channel codes. The HSDPA Data Extraction module (HSDPADatExt) 306 extracts HSDPA data and feeds the data to the Constellation Rotation and Gain Estimation module (ConRotGain) 308. In one implementation, the ConsRotGain module 308 may rotate the constellation of the HSDPA data such that it resembles the frequency division duplex (FDD) constellation. The Constellation Gain Estimation 308, SINR estimation 316 and demodulation in the downstream processing as shown in FIG. 3 may subsequently all assume FDD constellation format. Once the ConsRotGain module 308 completes its calculation, if the JDA_OUT_MODE bit is set, the nHSDPADatExt module 304 is enabled to perform the data extraction for non-HSDPA channel codes. The extracted data is written back into the JDA output FIFO module 302, and the data is then sent out through the external co-processor I/F port (ECP) interface. If the JDA_OUT_MODE bit is reset, all channel codes are sent out through the ECP interface. The PostJD module 108 may make no assumptions about the constellation gain (i.e., channel scaling factor) and perform a "blind" constellation gain estimation.

In some implementations, SINR and Constellation Gain may be both needed in BRP 110 and in software with different requirements regarding precision and reporting format. SINR may be calculated, for example, in 8.8 unsigned fractional format that is useful for CQI calculation in software. This value may be saved in one of the PostJD 108 output registers POST_JD_SINR_S0 to POST_JD_SINR_S4 correspondingly for each of the time slot in a single TTI, such that the software can retrieve the value at a later time. In some examples, the constellation gain is calculated in a specific format, such as 1.12 unsigned fractional format internally, but for software purposes it is more convenient to have a different format, such that a resulting value can be reformatted to avoid saturation. For example, the least significant bits (LSBs) are first zero padded to 16-bit length and then the resulting value becomes saturated.

In operation, the SINR value needs to be reformatted into a slot-exponent. This value can be derived from the SINR value in many ways, where a preferred approach is to choose an appropriate bit-slice of the SINR value and use log 2 of it as exponent.

The PostJD 108 also has a number of read-only registers that are typically used for reporting its data processing status to other components in the receiver 10. For example, constellation gain registers CONST_GAIN_S0 to CONST_GAIN_S4 may be used to store constellation gain obtained through hardware for each of the time slot, such that software can poll these registers anytime. For PostJD module 108 reporting status to the BRP 110, the constellation gain can be multiplied by 2 to resolve a difference in the definition of the constellation gain in PostJD 108 and BRP 110, and quantized into the same bit width as the main output to the BRP input memory. However, since the value is always positive, the sign bit can be omitted, and the resulting output may be 7 bits wide in 0.7 unsigned fractional format.

Figure 4:
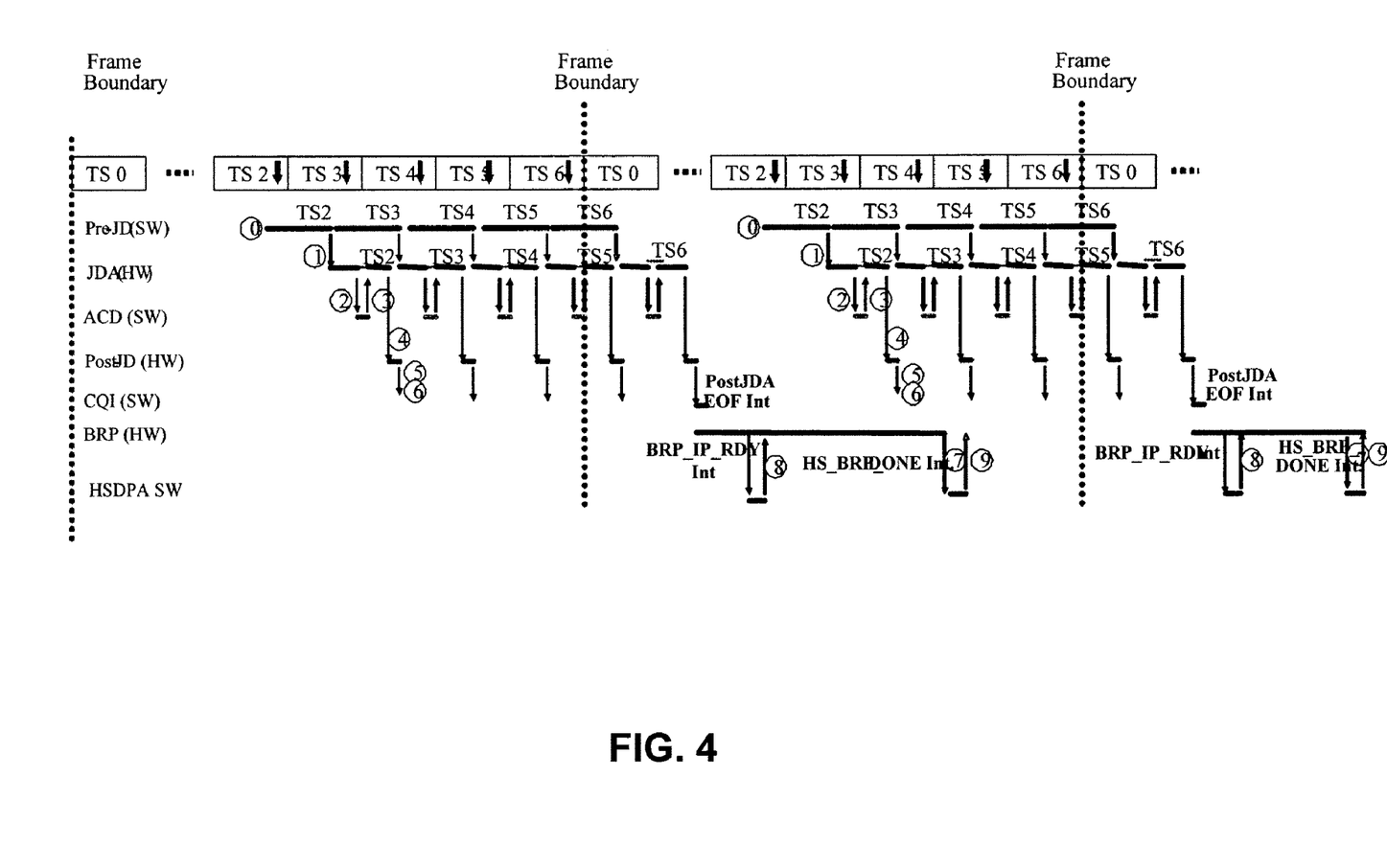
FIG. 4 shows an example data flow and transfer in a HSDPA receiver in a series of consecutive time slots.

Alternatively, the expected constellation gain may be given by software, in which case the constellation gain estimation is disabled. In some examples, a control bit (i.e., ConsGainEn) may select either estimated or fixed constellation gain. The constellation gain is supplied to the SINR estimation module 316 directly. One slot memory may be used to buffer the data from ConsRotGain module 308. The downstream PostJD computations may include the Physical Channel Demapping module 312 and SINR module 316. The output is supplied to the BRP 110 and the software as shown in FIG. 4. Once the PostJD module 108 completes processing for each Time Slot and for each Frame, it sends out EOS and EOF (End Of Slot and End Of Frame) signals respectively to indicate to the BRP processor 110 that the PostJD processor 108 has completed sending the data to the BRP Frame Buffer. At the same time, the EOS and EOF interrupt requests are sent to the DSP (not shown).

In addition, the BRP processor 110 internal control register bit, i.e., the Software Ready bit, is used to trigger the BRP 110 processing. This offers flexibility for the software to provide its own SINR and Constellation Gain to the downstream processing, in place of values that are provided by PostJD hardware calculation. This feature permits the algorithm to be optimized from time to time largely independent of PostJD hardware.

In some implementations, the BRP 110 may be configured to send the "BRP Input Ready interrupt" request to indicate to the software that the BRP 110 is ready to accept the next TTI data from PostJD 108. This interrupt request also initializes the next TTI data transfer to the JDA 106 hardware. The JDA 106 may start chip rate processing, and save all the data to the JDA 106 output FIFO 302. The non-HSDPA data is extracted and is written back to the same JDA Output FIFO 302 when PostJD constellation gain is determined for each time slot. As such, the JDA processing is re-used in both HSDPA and 384 Kbps data channels. This feature also enables the hardware design and associated software programming model to be dedicated to the HSDPA application specification while still have the ability to process data that complies with different standards.

Note that the active codes may be reordered by software, so that the HS-DSCH codes are the first to be processed in the JDA 106. This prevents a change in the number of non-HSDPA UE codes in use between two time slots which will affect the relative positioning of the HS-DSCH channels, thereby allowing these channels to be programmed only once per TTI.

Figure 5:
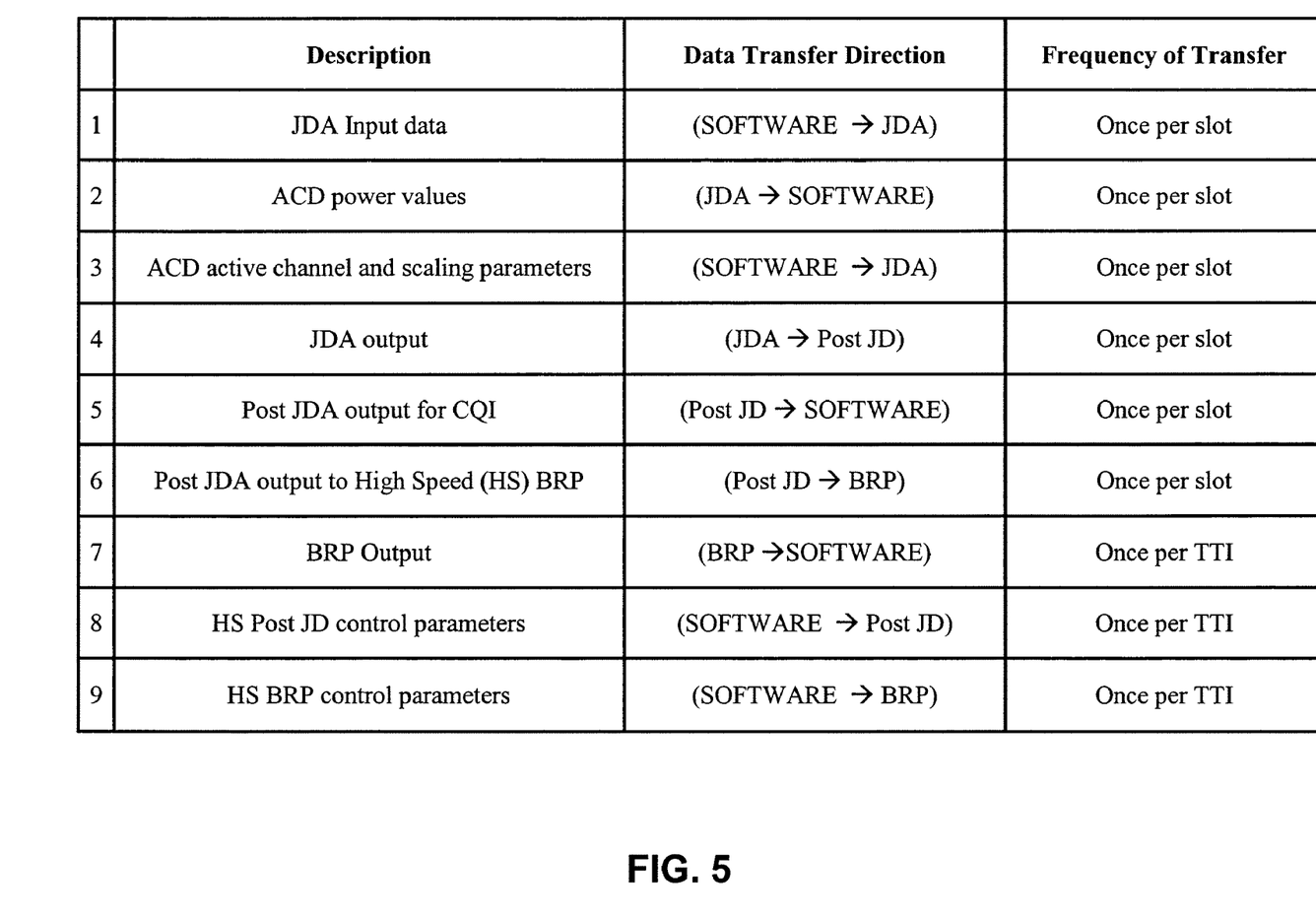
FIG. 5 is a table showing data flow in a HSDPA receiver.

FIG. 4 shows data transfer in the HSDPA receiver 10 in a series of nine consecutive time slots with reference to the system configuration in FIG. 1A. More specifically, the table in FIG. 5 summarizes the major data transferring occurred during each time slot. For example, referring to rows 1, 3, 8 and 9 in FIG. 5, the HSDPA receiver 10 may rely on data calculated and supplied by the software. Row 1 shows that the JDA 106 implemented as the first component in the HSDAP signal chain operates once per downlink time slot. The JDA 106 inputs such as data samples, channelization codes, channel estimate and control information, are provided by the software and sent to the JDA hardware as one complete data transfer. The JDA 106 also produces output once per time slot. The second component in the HSDPA signal chain may be the PostJD module 108. The input data of the PostJD module 108 is obtained from the JDA 106 (i.e., time slot 4 in FIG. 4 and row 4 in FIG. 5) and the control parameters come from the software (i.e., time slot 8 in FIG. 4 and row 8 in FIG. 5). Post JD module 108 hardware may be programmed by the software, before the first slot of data reaches the post JD. The PostJD 108 programming is implemented on a TTI basis and PostJD processes data in a slot-by-slot manner.

Regarding the third component in the HSDPA signal chain BRP 110, the PostJD module 108 output is transferred to the BRP 110 input memory in a slot-by-slot manner and this transfer is handled internally by the hardware. That is, data is usually downloaded in increments of one timeslot or sub-frame, but internally processed by the BRP 110 at the frame rate and TTI rate. The extracted transport blocks may be stored in the transport block buffer at the TTI rate of the associated transport channel. Transport channel data for multiple transport channels with the same TTI will become available at the same time. In one implementation, the frame rate operation in BRP 110 requires downloading frame data and frame configuration every 10 ms. The TTI rate operation requires programming transport channel control registers every TTI for each active transport channel. BRP 110 programming is thus implemented on a TTI basis, and BRP 110 co-processor produces output once every HSDPA TTI.

Figure 6:
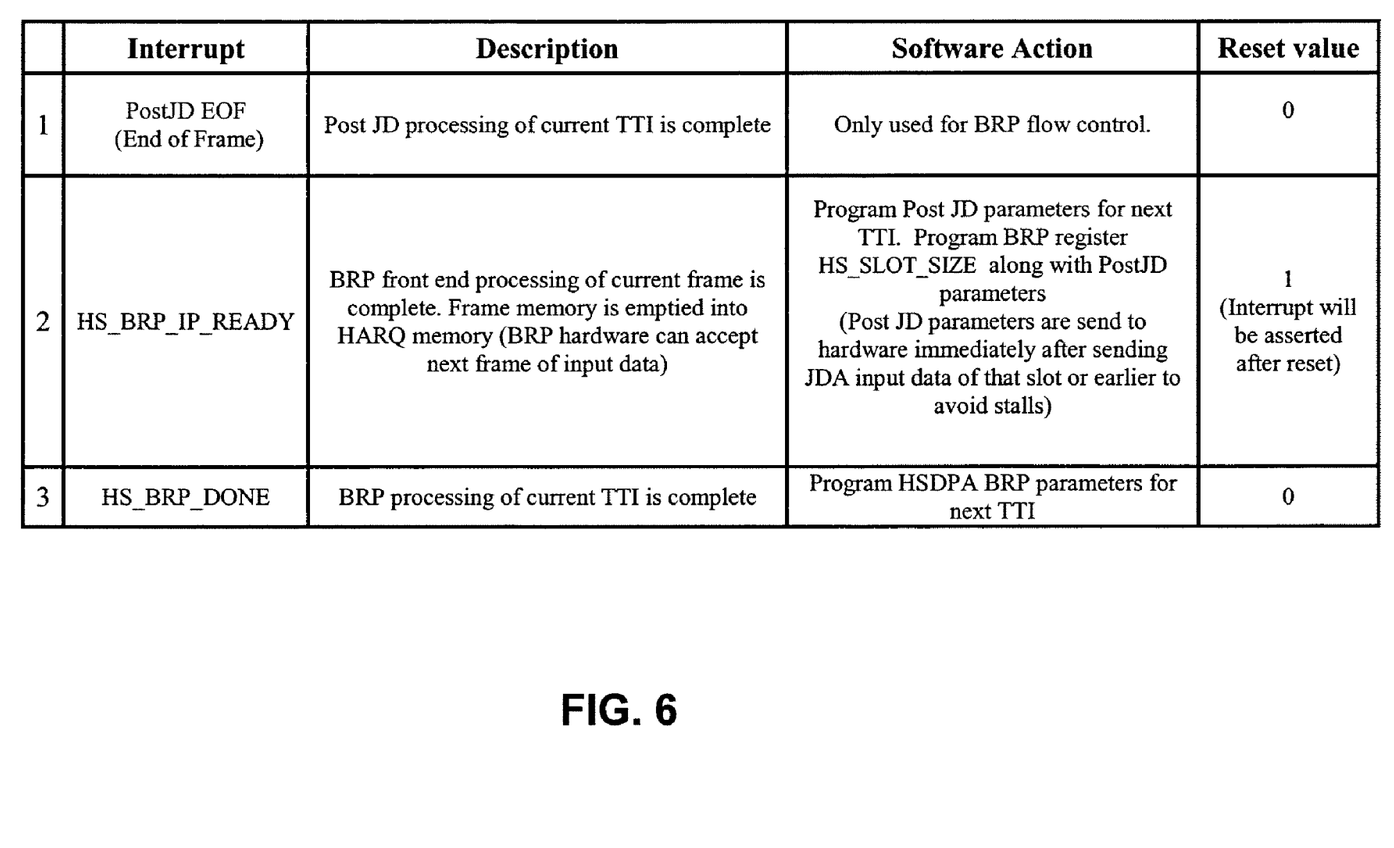
FIG. 6 is a table listing interrupts and recommended software actions in a HSDPA receiver.
Figure 7:
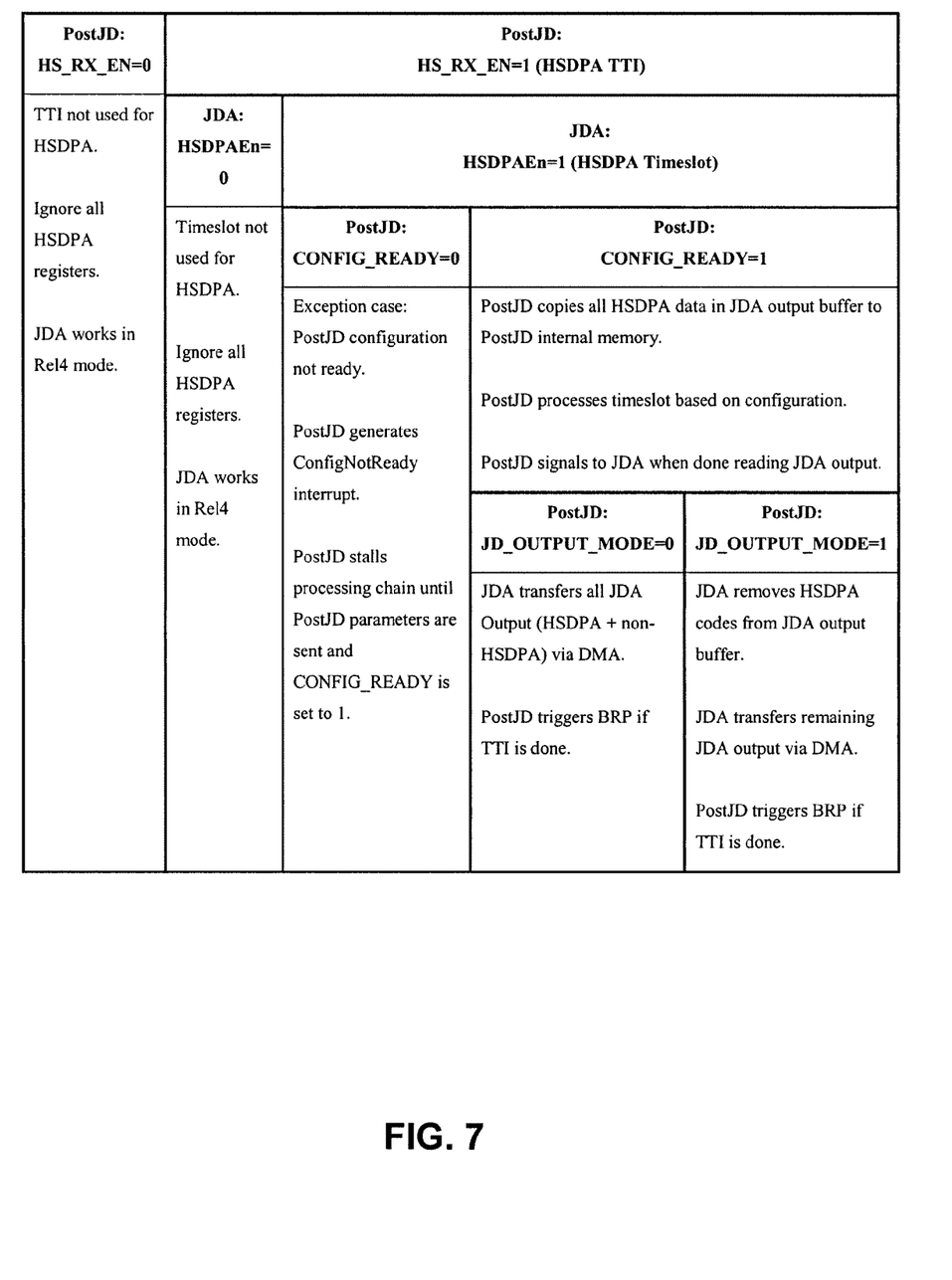
FIG. 7 is a table showing control parameters in execution sequence for HSDPA and non-HSDPA processing.

FIG. 6 lists interrupts and recommended software actions. For example, BRP 110 will raise interrupt HS_BRP_DONE upon completing the processing of a current TTI such that the software can program BRP 110 parameters for the next TTI. FIG. 7 summarizes the parameters that control the intended execution sequence for HSDPA and non-HSDPA processing with regards to the HSDPA processing chain. It can be seen from the leftmost column of the table in FIG. 7 that when the receiver 10 is not processing HSDPA data, the register HS_RX_EN bit may be set to zero. In this case, the JDA 106 may work independently of the PostJD module 108 and the BRP 110 accordingly disables HSDPA processing. This may be implemented by ignoring all HSDPA specific registers in PostJD module 108 and the BRP 110, and setting the HSDPA enable bit in JDA 106 to zero. On the other hand, when the current TTI contains HSDPA data, the register HS_RX_EN bit can be set to 1 to enable HSDPA processing. This also informs the JDA 106 to act on the HSDPA enable bit and activate the PostJD module 108 for time slots containing HSDPA data and ultimately triggers the BRP 110 when the entire TTI is received.

Since not all timeslots in a HSDPA TTI contain HSDPA data, the JDA 106 is informed via the HSDPA enable bit which time slots to process as HSDPA timeslots and which to treat as if the HS_RX_EN bit is 0. When HSDPA enable bit is 0, the JDA 106 may not exchange data or signal the PostJD module 108, but rather sends out all output data via direct memory access (DMA) after completing execution. When HSDPA enable bit is 1, the PostJD module 108 is triggered upon JDA 106 completion. If the programming of the PostJD module 108 is not ready (i.e., CONFIG_READY=0) at this time, the PostJD module 108 may indicate to the software that the configuration of the PostJD module 108 has not been performed, and the PostJD module 108 also stalls until the configuration is successfully written and a CONFIG_READY bit is set to 1. PostJD module 108 then copies the HSDPA data from the JDA output buffer and signals the JDA 106. The JDA 106 subsequently removes the HSDPA data (if JD_OUTPUT_MODE=1) from the JDA output buffer and proceeds to transferring the data to the PostJD module 108. The JD_OUTPUT_MODE bit is from PostJD module 108 configuration register. The software may need to program JD_OUTPUT_MODE bit in the PostJD module 108 before the end of JDA 106 hardware processing. However, if JD_OUTPUT_MODE=0 the JDA 106 may not remove HSDPA data before the transfer. The JD_OUTPUT_MODE bit is programmed per TTI, so even though it only affects the JDA 106 it is programmed with the PostJD module 108 on a TTI basis.

The PostJD module 108 may keep count of the number of HSDPA timeslots in the TTI based on HS_RX_TSs bit and the number of times it is triggered by JDA 106. Once the PostJD module 108 determines that the whole TTI has been received it triggers the BRP 110.

In order to implement the above sequence, a programming sequence outlined below may be followed.

1. Program the PostJD module 108 by setting configuration registers shared by all time slots belonging to a TTI and set the BRP 110 register HS_SLOT_SIZE for the TTI.

2. Program the JDA 106 for processing of the first HSDPA time slot (HSDPA enable bit is 1). Any non-HSDPA time slots preceding the first HSDPA time slot can be programmed independently of the PostJD 108 as long as the HSDPAEn bit is set to 0 for that timeslot. Step 2 may be executed before step 1 in the event that the programming of the PostJD is completed before the JDA 106 completed the first timeslot of the TTI. This can expedite the processing of data.

3. Program the BRP 110. If the BRP 110 processing is already running (for any preceding HSDPA TTI) this programming may be postponed until the BRP signals that it has completed processing of that TTI (HS_BRP_DONE interrupt). Meanwhile, the programming of the JDA 106 below may proceed in parallel.

4. Program JDA 106 for the remaining time slots as data becomes available from the PreJD 104. If any of the in-between time slots does not contain HSDPA data, set the HSDPAEn bit to 0 for that timeslot. For all time slots containing HSPDA data, the HSDPAEn bit may be set to 1.

The following two modes may be specified for different performance requirements. For example, if a slot-overlap mode is adopted, which is default, the overall performance of JDA 106 may be higher than that of non-overlap mode. More specifically, the slot-overlap mode refers to concurrently carrying out the input to the JDA 106 and output from the JDA 106 with next time slot hardware processing. This mode can shorten overall data processing time of the JDA 106. Non-slot-overlap mode in contrast is mainly used for debugging purposes because it can provide a nice and clean flow control for software debugging.

- Slot-overlap mode (recommended mode): In this mode, JDA 106 programming of the next slot occurs when JDA 106 hardware is processing a current slot. The slot overlap mode is recommended for the highest data rate case with 5 HSDPA time slots per TTI.
- Non-slot-overlap mode: In this mode, JDA 106 programming of the next slot takes place after JDA 106 completes processing of the current slot. Software will be indicated by either a EOSx interrupt from the PostJD module 108 or a JDADone interrupt from the JDA 106. This mode can be used for debugging purposes.

5. Once all the HSDPA timeslots within the TTI have been processed by the PostJD module 108, the BRP 110 may be automatically triggered. However, if the BRP 110 has not been programmed at this point, the BRP 110 will indicate to the software. Once it has consumed its input data, the BRP 110 may issue an interrupt (BRP Input Ready) and the programming of the next TTI can safely start.

Figure 8:
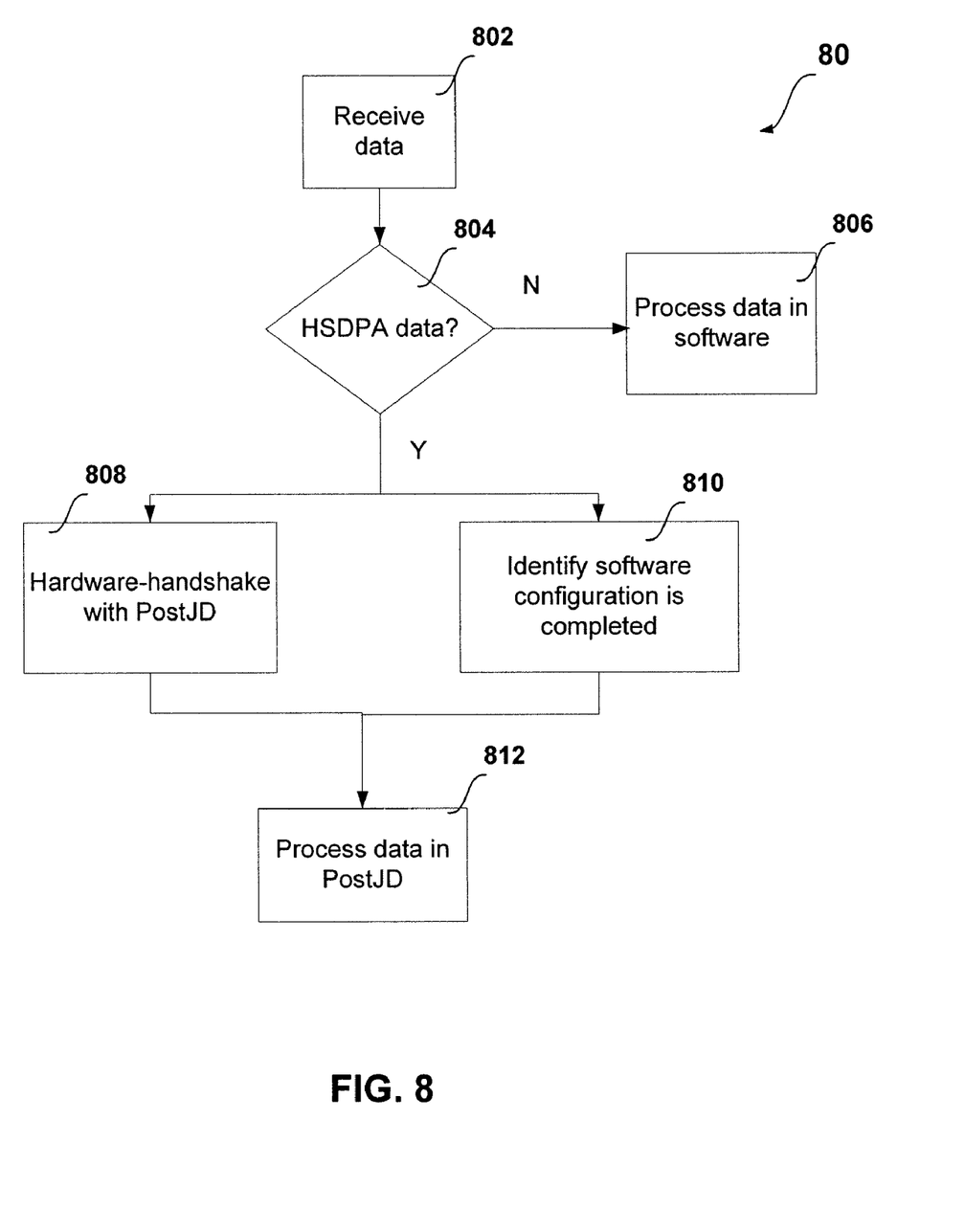
FIG. 8 shows a flow diagram showing example processing operations.

FIG. 8 is a flow diagram showing an example process 80 for controlling data flow in the receiver 10. In process 80, input data are received (802) by the JD pre-processing module 104, and as shown in FIG. 2, data will be further processed by the JDA front end processor 106. In particular, HSDPA channel data can be extracted and a signal may be sent 804 to the PostJD module 108 according to the hardware handshake protocol between the JDA 106 and the PostJD module 108 to indicate that the data is ready for downstream processing. At the same time, the receiver 10 may identify 806 whether software configuration of the PostJD module 108 is completed or not. If both conditions are satisfied, the PostJD module 108 starts processing 808 data.

The SINR and constellation gain output registers can be accessed on a slot-by-slot basis if desired, but can also be read out after the completion of the TTI. The SINR output ready (which may be used for CQI calculation) is signaled by a time slot completion interrupt for each time slot. For example, PostJD module 108 includes a status register comprising a number of status bits that can be used to check the progress of the hardware of the PostJD module 108. In particular, bits EOS0 to EOS4 in the status register are dedicated for saving the status for each time slot in a TTI. The software can mask out any undesired slot completion interrupt. However, the hardware needs to be flexible enough to allow any or all of these interrupts to be processed by software. The numbering of the slot completion interrupts is relative. For example, if three time slots are in use, the last slot in a frame may correspond to EOS2, regardless of which physical timeslot is used.

The software may also apply BRP flow control by delaying the programming of the BRP 110. This operation halts the signal chain upon PostJD completion (When EOF is issued) and allows software to manipulate the constellation gain and SINR for each slot within the frame before triggering the BRP 110. The processing is resumed by writing the BRP configuration register. The SINR and Constellation Gain parameters may be accessed through a BRP debug interface (not shown).

In this description, connections may be wired or wireless connections. When one module is said to be connected to another module, the module may be directly connected or indirectly connected (via, e.g., still another module) to the other module.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the application and provides examples to describe the application and to enable a person of ordinary skill in the art to make and use the application. This written description does not limit the application to the precise terms set forth. Thus, while the application has been described in detail with reference to the examples set forth above, those of ordinary skill in the art can effect alterations, modifications and variations to the examples without departing from the scope of the application.

What is claimed is:

1. A method for controlling data flow in a wireless communication system, comprising:
    receiving data in a first data processing module;
    enabling a second data processing module when at least one signal time slot of the received data comprises data that complies with a first data transmission standard;
    exchanging signals between the first data processing module and software executing in a processor to indicate that the first data processing module is ready to transmit data to the second data processing module, and determining that a software configuration of the second data processing module has been completed;
    if the first data processing module is ready to transmit data to the second data processing module, but the software configuration of the second data processing module has not been completed, preventing transmitting data from the first data processing module to the second data processing module until the software configuration of the second data processing module has been completed;
    processing the data in the second data processing module for the at least one signal time slot; and
    enabling a third data processing module upon a completion of processing at least one data block in the second data processing module, and determining that a software configuration of the third data processing module has been completed, the at least one data block comprising data associated with a transmission time interval having multiple signal time slots,
    wherein the first data processing module includes a joint detection accelerator that jointly detects signals from multiple users, the joint detection accelerator comprising a first-in, first-out (FIFO) module, and
    wherein the first data processing module is configured to extract data that complies with a second data transmission standard, and process the data in the second data transmission standard by software executing in the processor.

2. The method of claim 1, wherein the first data transmission standard comprises high speed downlink packet access (HSDPA).

3. The method of claim 1, wherein the second data processing module processes and converts output data from the first data processing module into a format suitable for the third data processing module.

4. The method of claim 1, wherein the third data processing module includes a bit rate processor.

5. The method of claim 1, wherein the software executing on the processor provides a constellation gain value to the second data processing module.

6. The method of claim 1, wherein the second data processing module is configured to provide a signal-to-interference-and-noise-ratio (SINR) value.

7. The method of claim 6, wherein the SINR value is computed on a time slot basis.

8. An apparatus for controlling data flow in a wireless communication system, comprising:
    a first data processing module that receives data;
    a second data processing module that is enabled when at least one signal time slot of the received data comprises data that complies with a first data transmission standard, in which the joint detection post-processing module processes data on a time-slot basis;
    a processor to execute software in which signals are exchanged between the first data processing module and the software to indicate that the first data processing module is ready to transmit data to the second data processing module, and to determine that a software configuration of the second data processing module has been completed,
    if the first data processing module is ready to transmit data to the second data processing module, but the software configuration of the second data processing module has not been completed, the processor prevents transmitting data from the first data processing module to the second data processing module until the software configuration of the second data processing module has been completed;
    and
    a third data processing module enabled upon a completion of processing at least one data block in the second data processing module and determining that a software configuration of the third data processing module has been completed, the at least one data block comprising data associated with a transmission time interval having multiple signal time slots, wherein the first data processing module includes a joint detection accelerator that jointly detects signals from multiple users, the joint detection accelerator comprising a first-in, first-out (FIFO) module, wherein the first data processing module is configured to extract data that complies with a second data transmission standard, and process the data in the second data transmission standard by software executing in the processor.

9. The apparatus of claim 8, wherein the first data transmission standard is high speed downlink packet access (HSDPA).

10. The apparatus of claim 8, wherein the second data processing module processes and converts output data from the first data processing module into a format suitable for the third data processing module.

11. The apparatus of claim 8, wherein the third data processing module includes a bit rate processor.

12. The apparatus of claim 8, wherein the software executing on the processor provides a constellation gain value to the second data processing module.

13. The apparatus of claim 8, wherein the second data processing module is configured to provide a signal-to-interference-and-noise-ratio (SINR) value.

14. The apparatus of claim 13, wherein the SINR value is computed on a time slot basis.

15. A method for controlling data flow for high speed downlink packet access (HSDPA) data and non-HSDPA data in a wireless communication system, comprising:
   receiving data in a joint detection accelerator that jointly detects signals from multiple users;
   enabling a joint detection post-processing module when at least one signal time slot of the received data comprises data that complies with HSDPA transmission standard;
   exchanging signals between the joint detection accelerator and software executing in a processor to indicate that the joint detection accelerator is ready to transmit data to the joint detection post-processing module, and determining that a software configuration of the joint detection post-processing module has been completed;
   if the joint detection accelerator is ready to transmit data to the joint detection post-processing module, but the software configuration of the joint detection post-processing module has not been completed, preventing transmitting data from the joint detection accelerator to the joint detection post-processing module until the software configuration of the second data processing module has been completed;
   processing the data in the joint detection post-processing module for the at least one signal time slot; and
   enabling a bit-rate processor upon completion of processing at least one data block in the joint detection post-processing module and determining that a software configuration of the bit-rate processor has been completed, the at least one data block comprising data associated with a transmission time interval having multiple signal time slots, wherein the joint detection accelerator is configured to extract data that complies with a non-HSDPA data transmission standard, and process the data in the non-HSDPA data transmission standard by software executing in the processor.

16. The method of claim 15, wherein the software executing on the processor provides a constellation gain value to the joint detection post-processing module.

17. The method of claim 15, wherein the joint detection post-processing module is configured to provide a signal-to-interference-and-noise-ratio (SINR) value.

18. The method of claim 17, wherein the SINR value is computed on a time slot basis.

19. An apparatus comprising:
   a joint detection accelerator to receive data and jointly detect signals from multiple users;
   a joint detection post-processing module that is enabled when at least one signal time slot of the received data comprises data that complies with high speed downlink packet access (HSDPA) transmission standard, in which the joint detection post-processing module processes data on a time-slot basis;
   a processor to execute software in which signals are exchanged between the joint detection accelerator and the software to indicate that the joint detection accelerator is ready to transmit data to the joint detection post-processing module, and to determine that a software configuration of the joint detection post-processing module has been completed;
   if the joint detection accelerator is ready to transmit data to the joint detection post-processing module, but the software configuration of the joint detection post-processing module has not been completed, the processor prevents transmitting data from the joint detection accelerator to the joint detection post-processing module until the software configuration of the second data processing module has been completed; and
   a bit-rate processor that is enabled upon completion of processing at least one data block in the joint detection post-processing module, the at least one data block comprising data associated with a transmission time interval (TTI) having multiple signal time slots, in which the bit-rate processor processes data on TTI basis, wherein the joint detection accelerator is configured to extract data that complies with a non-HSDPA data transmission standard, and process the data in the non-HSDPA data transmission standard by software executing in the processor.

20. The apparatus of claim 19, wherein the software executing on the processor provides a constellation gain value to the joint detection post-processing module.

21. The apparatus of claim 19, wherein the joint detection post-processing module is configured to provide a signal-to-interference-and-noise-ratio (SINR) value.

22. The apparatus of claim 21, wherein the SINR value is computed on a time slot basis.

* * * * *